No. 617,916. Patented Jan. 17, 1899.
W. F. WILLIAMS.
BICYCLE SUPPORT.
(Application filed Dec. 9, 1896.)
(No Model.) 2 Sheets—Sheet 1.
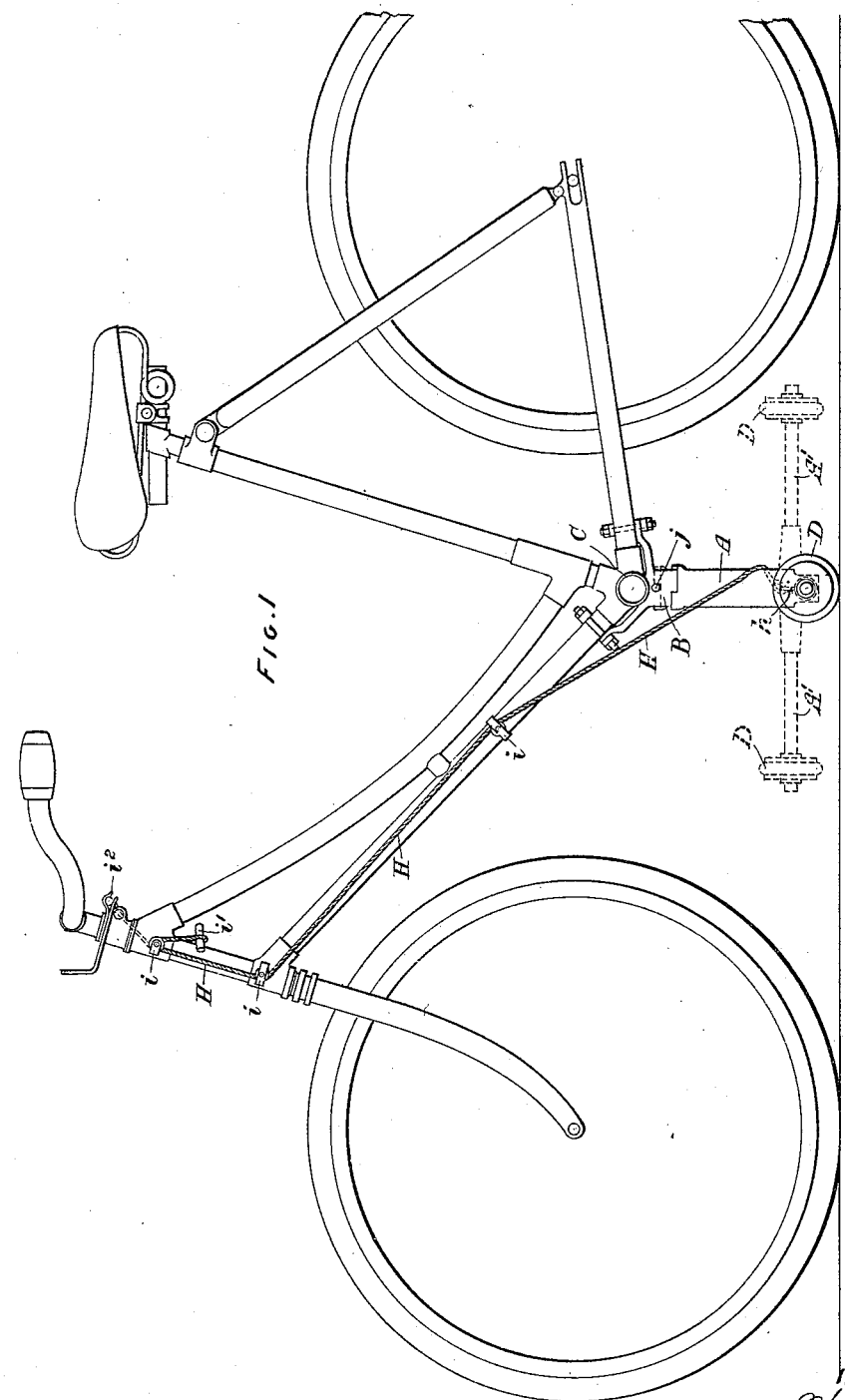

No. 617,916. Patented Jan. 17, 1899.
W. F. WILLIAMS.
BICYCLE SUPPORT.
(Application filed Dec. 9, 1896.)
(No Model.) 2 Sheets—Sheet 2.
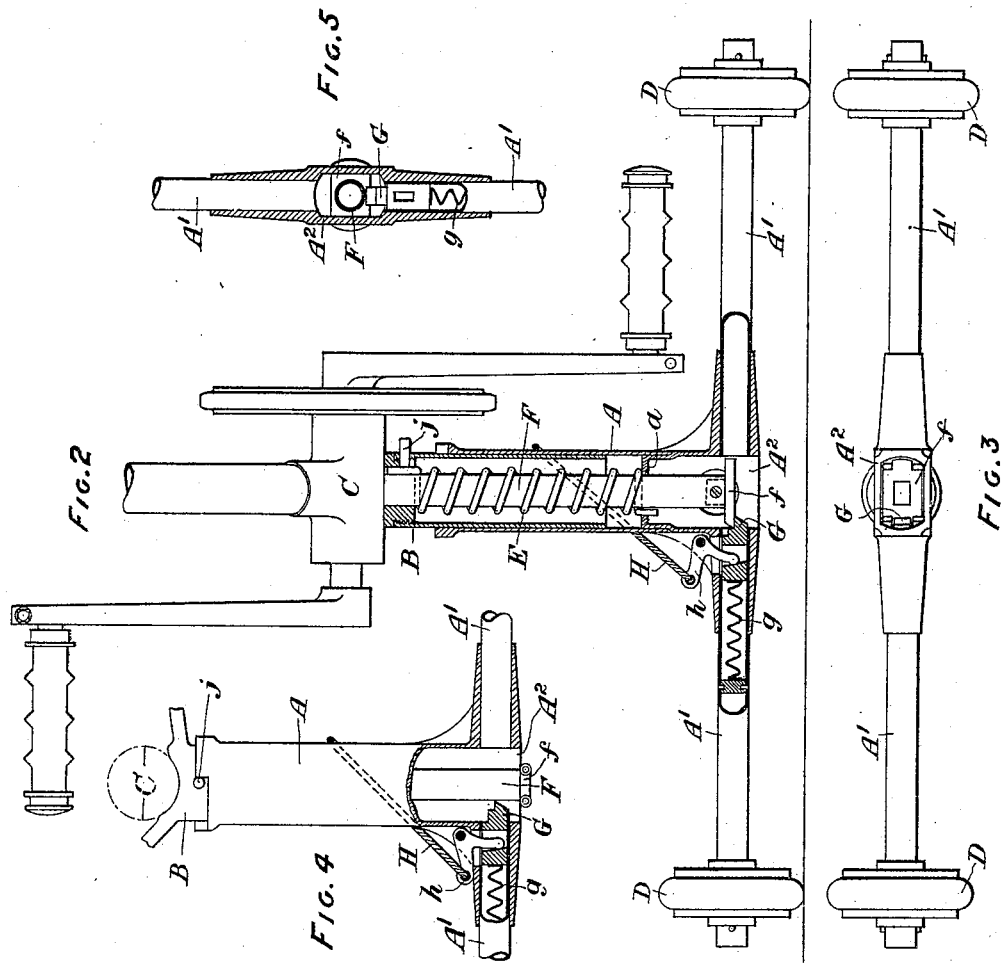
WITNESSES.
INVENTOR:
W. F. Williams.
BY
ATTORNEYS.
THE NORRIS PETERS CO., PHOTO-LITHO., WASHINGTON, D. C.

UNITED STATES PATENT OFFICE.

WILLIAM FREDERICK WILLIAMS, OF LONDON, ENGLAND.

BICYCLE-SUPPORT.

SPECIFICATION forming part of Letters Patent No. 617,916, dated January 17, 1899.

Application filed December 9, 1896. Serial No. 614,996. (No model.)

*To all whom it may concern:*

Be it known that I, WILLIAM FREDERICK WILLIAMS, gentleman, of 32 Shaftesbury avenue, London, W., England, have invented a new and useful Improvement in Bicycle-Supports, (which has been patented in Great Britain, No. 18,201, dated August 17, 1896; in France, No. 261,666, dated November 27, 1896; in Belgium, No. 124,848, dated November 28, 1896, and in Germany, No. 93,569, dated December 3, 1896,) of which the following is a full, clear, and exact description.

My invention relates to improved means whereby a bicycle may be maintained in the upright position when traveling very slowly or when stopped, whether the rider be dismounted or not.

The invention consists in the particular construction and combination of parts, as hereinafter fully described, and pointed out in the claims.

The invention is illustrated in the accompanying drawings, forming part of this specification, wherein—

Figure 1 is a side elevation of a bicycle having my improved support applied. Fig. 2 is a part-sectional elevation, and Fig. 3 an under side plan view, of the support as in position for use. Fig. 4 is a part-sectional elevation, and Fig. 5 a part-sectional plan view, showing the support in the raised or inoperative position.

The support consists of a ⊥-shaped bracket or frame, the vertical member A of which is fitted to slide up and down and to turn upon a tubular pillar B, which is formed on or affixed to and projects vertically downward from the bottom bracket C of the machine-frame. Upon the extremities of the horizontal arms A' of said frame are mounted rubber-tired or other rollers D, (or instead of rollers the arms A' may terminate in feet,) adapted to rest on the ground in order to afford the lateral support required. A spiral spring E, contained within the tubular pillar B, is confined between and connected to an abutment at the upper end and a cross-head $a$, fixed in the tube A, so that said spring acts both by compression and by torsion, the former tending to force the support downward and the latter tending to rotate it about the pillar B, so as to bring it into operative position. Through this spring passes a central fixed guide-stem F, upon which the cross-head $a$ slides, this stem F terminating at its lower end in a locking cross-head $f$. This cross-head $f$ is of oblong form in plan, and the lower part $A^2$ of the sliding tube A, within which said locking cross-head is received, is of corresponding shape, for the twofold purpose of preventing the support, when in the lowered and operative position, from turning about the pillar B and of resisting the thrust of the spring E when the support has been raised and turned into the fore-and-aft position. This cross-head $f$ is engaged when the support is lowered into operative position by a bolt G, fitted to slide in one of the tubular arms A', and thrown into engagement by a spring $g$, the end of the cross-head $f$ and of the bolt being beveled, so as to admit of the one being forced by the spring E into engagement with the other when the support reaches its lowest position, as shown in Figs. 2 and 3. The release of this bolt and the raising and turning of the support are effected by a cord H, attached to a lever $h$, pivoted to the part A and engaging with the bolt. The cord H makes a partial turn about the part A, so as when pulled to exert a turning moment thereon in opposition to the spring E. The cord passes through guide-pulleys $i\ i$ on the machine-frame and terminates in a handle $i'$ or other means of applying a pull to it, which handle is made fast to a clip $i^2$ or other attachment on the machine-frame when the support is raised to its inoperative position. Instead of the spring $g$ the lever $h$ might be counterweighted to produce the same effect.

$j$ is a stud on the pillar B engaging with a notch on the tube A for limiting the rotary motion of the latter to a quarter-turn.

In the raised inoperative position, illustrated by dotted lines in Fig. 1 the spring E is compressed and in torsion, so that it tends to force the support downward and also to turn it about its vertical axis, so as to bring the arms A' from the raised fore-and-aft inoperative position shown in dotted lines to the lowered position shown in full lines. Of these two motions the turning must be effected first and therefore out of contact with the ground, the lowering being prevented by the engagement, as shown in Figs. 4 and 5, of the cross-head $f$ with the end of the socket $A^2$. When lowered, the engagement of the bolt G with the cross-head $f$ enables the arms $A'$ to resist the weight which comes on them when they bear upon the ground.

In raising and turning the support to the inoperative position the raising movement must first be effected in consequence of the fitting of the cross-head $f$ in the socket $A^2$, so that the turning motion is always performed out of contact with the ground, the two motions being successively performed by pulling upon the cord H.

I claim—

1. The combination with a frame, of a pillar rigid thereon, a member fitted to slide and to turn on said pillar, an arm carried horizontally by said member, a stem run through the pillar and rigid with the frame, the stem projecting down through the said member, a spring coiled around the stem and attached to the frame and to the said member, a spring-pressed pawl carried by the said member and capable of engaging the stem to coact therewith, and means for simultaneously operating the pawl and turning and raising the said member.

2. The combination with a frame, of a pillar rigidly attached thereto, a stem also rigidly attached to the frame and run centrally through the pillar, a member sliding and turning on the pillar and extending below the same, the stem having connection with said member, a cross-head carried by the lower end of the stem, a spring-pressed pawl carried in an arm on said member and capable of engaging with the cross-head and with the stem, a spiral spring coiled around the stem and attached to the said member and to the frame, a lever fulcrumed on the said member and engaged with the pawl, and a flexible connection attached to the lever and turned partly around the said member.

3. A bicycle-support, comprising a frame having a tubular standard fitted to slide upon a post or pillar projecting downwardly from the bicycle-frame, a spiral spring within the tubular standard and pillar or post and adapted to be subjected to compression and torsion by the rising and turning movement of the frame, a stem projecting downwardly from the pillar and post through the spring, a spring-actuated bolt engaging the end of the stem, a lever engaging the bolt and a cord for releasing the bolt, substantially as described.

4. The combination with a bicycle-frame, of a stem rigidly secured to the frame between the wheels thereof and provided at its lower end with a cross-head, a pillar inclosing the stem and also rigidly secured to the frame, a tubular member slidable and revoluble on the pillar and having its lower portion shaped to snugly receive the cross-head of the stem, whereby the tubular member is prevented from turning when lowered, a spiral spring coiled around the stem and attached to the frame and tubular member, an arm attached to the tubular member and extending horizontally therefrom, a latch carried by the said arm and engaging the cross-head of the stem, and means for releasing the latch and for turning and sliding the tubular member, substantially as described.

5. The combination with a frame, of a tubular pillar attached rigidly thereto, a stem rigidly attached to the frame and inclosed by the pillar, a tubular member loose to slide and turn on the pillar, a spiral spring embracing the stem and attached to the frame and to the said tubular member, an arm attached to the tubular member, means for locking the tubular member with the stem, and means for turning and sliding the tubular member on the pillar, such means coacting with the locking means to release the same.

6. The combination of a stem, a pillar inclosing the stem, the stem and pillar being rigid with each other, a spiral spring encircling the stem and having one end in rigid connection therewith, a tubular member slidable and revoluble on the pillar and having connection with the remaining end of the spring, an arm attached to the tubular member, a locking device carried by the arm of the tubular member and engaging the stem, and means for disengaging the locking device and turning and raising the tubular member.

7. The combination with a frame, of a hollow pillar rigidly attached thereto, a stem also rigidly attached to the frame, the stem being run through the pillar, a tubular member slidable and revoluble on the pillar, a spiral spring encircling the stem and attached to the frame and to the tubular member, an arm carried by the tubular member, and a cord in connection with the tubular member and turned partly around the same.

WILLIAM FREDERICK WILLIAMS.

In presence of—
C. G. CLARK,
T. W. KENNARD.